United States Patent

[11] 3,536,167

[72] Inventor Heinrich Bernhard Rath
  Koblenz-leutzel, Germany
[21] Appl. No. 770,597
[22] Filed Oct. 25, 1968
[45] Patented Oct. 27, 1970
[73] Assignee Girling Limited
  Birmingham, England
[32] Priority Oct. 31, 1967
[33] Great Britain
[31] 49,314/67

[54] CLOSED LOOP TYPE DISC BRAKE WITH LOCATING INSERT MEANS
7 Claims, 5 Drawing Figs.
[52] U.S. Cl............................................ 188/73.4
[51] Int. Cl............................................ F16d 65/00
[50] Field of Search............................ 188/73, 73CL

[56] References Cited
UNITED STATES PATENTS
3,421,603  1/1969  Schuchmann et al......... 188/73(cl)UX Primary Examiner—George E. A. Halvosa
Attorney—Scrivener, Parker, Scrivener and Clark ABSTRACT: The invention provides a spot type disc brake in which a yoke of platelike material is slidably received in longitudinal grooves at opposite sides of a body member containing a hydraulic actuator operative between a directly operated pad and the yoke which actuates an indirectly operated pad. A movable component of the actuator, such as a piston, contains a blind bore in which a flat tongue on the yoke is located by ringlike insert of low friction plastics material, such as P.T.F.E. The insert member has pairs of internal fingers by which it engages the opposite faces of the tongue.

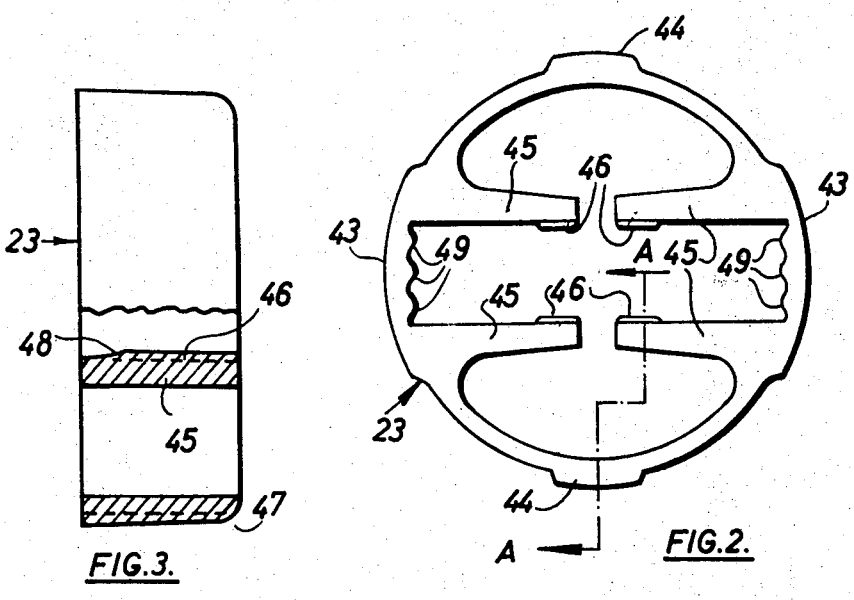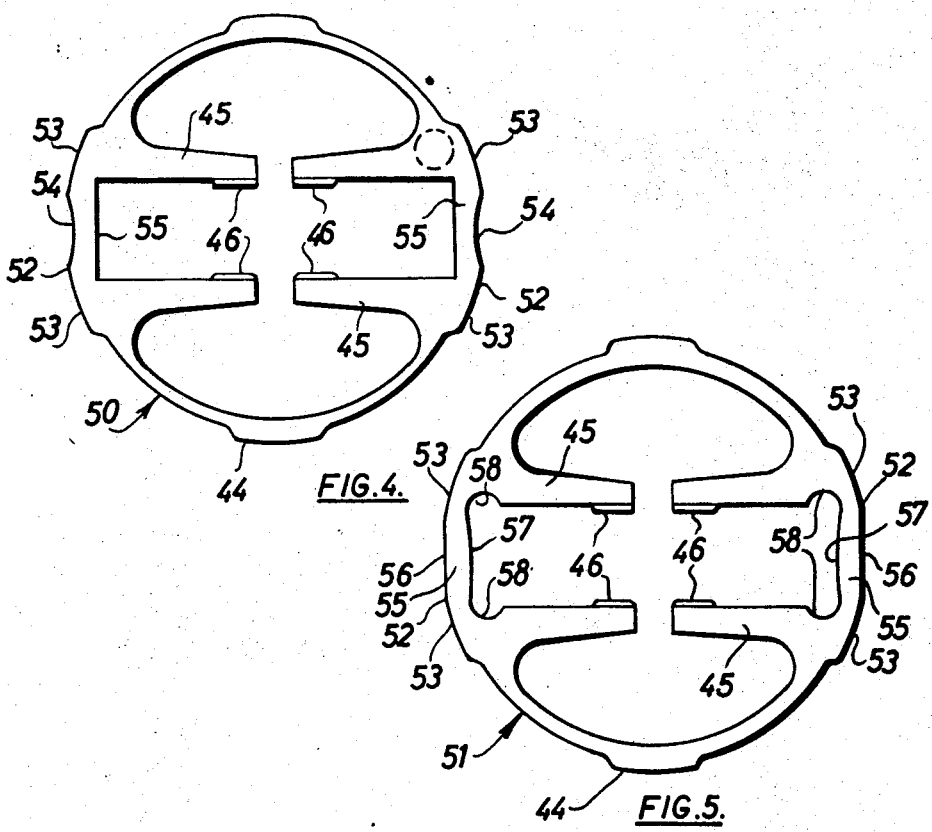

CLOSED LOOP TYPE DISC BRAKE WITH LOCATING INSERT MEANS

The present invention relates to a spot type disc brake provided with a hydraulic actuator operative between a directly operated pad and a yoke adapted to support an indirectly operated pad as described in Schuchmann et al. U.S. Pat. application Ser. No. 594,459 filed Nov. 15, 1966 now U.S. Pat. No. 3,421,603.

According to the present invention, an operative component of the actuator has a cylindrical bore in which a ringlike insert member of resilient synthetic plastics material is received, said insert member having internal fingers, adapted to support and locate an inwardly directed tongue formed on said yoke.

The insert member is conveniently of generally circular configuration but with four equicircumferentially spaced external lands for slidable engagement with the cylindrical bore.

The invention is further described, by way of example, with reference to the accompanying drawings, in which:

FIG. 2 is an elevation, to a larger scale, of an insert member of the brake;

FIG. 3 is a side elevation of the insert member, partly sectioned on the line A-A of FIG. 2; and FIGS. 4 and 5 are elevations, similar to FIG. 3 but showing two further embodiments of insert member.

Figure 1:
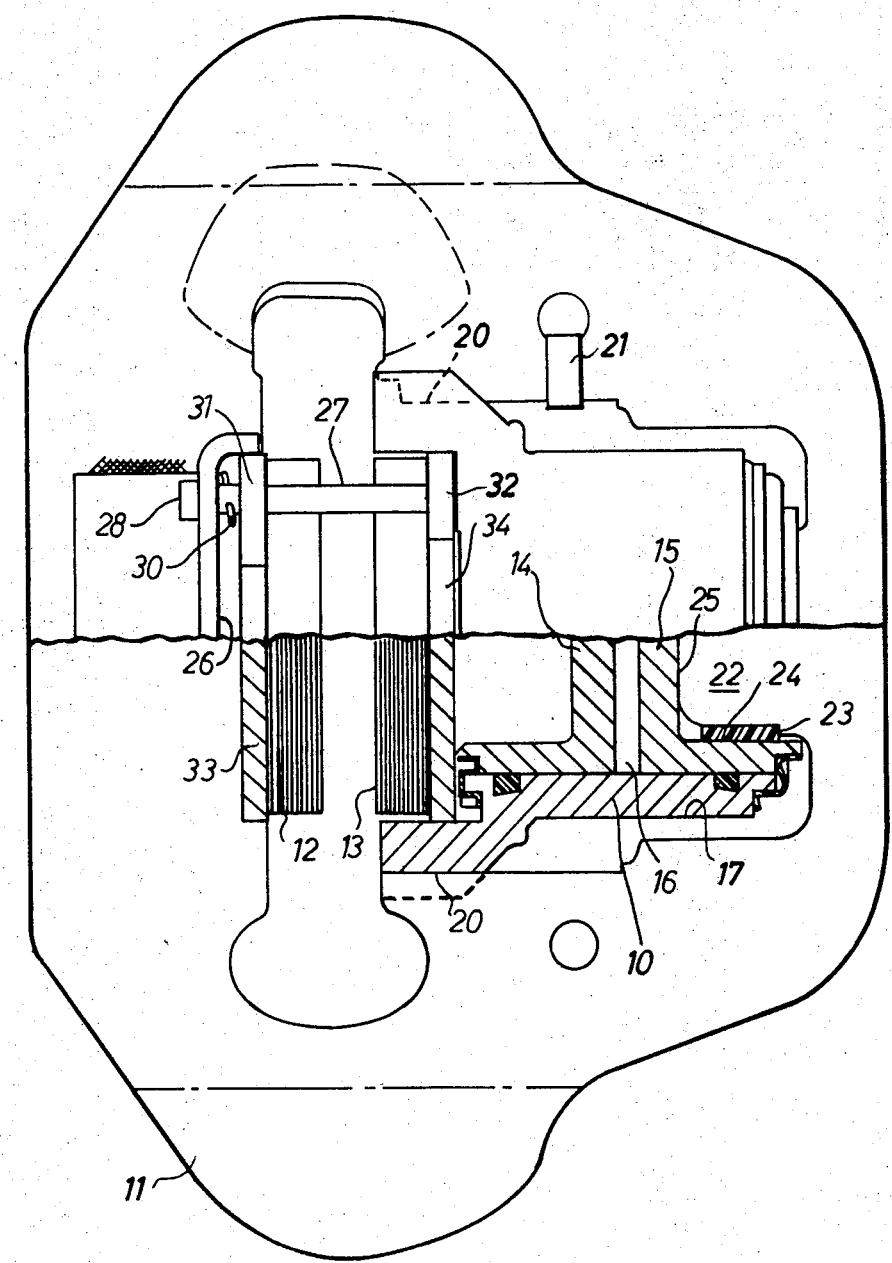
FIG. 1 is a plan view, half-sectioned, of a spot type disc brake constructed in accordance with the invention.

Referring to FIG. 1 of the drawings, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons 14 and 15 slidable within a cylinder 16 constituted by a through bore 17 in the body member 10.

The body member 10 has a pair of mounting lugs (not shown) adapted to be bolted to a torque plate or other fixed part of the wheel mounting (not shown) adjacent a disc (also not shown) so that the disc periphery extends between the pads 12, 13. The body member 10 has a pair of longitudinal grooves 20 formed at opposite sides thereof, in which grooves the inside edges of the yoke 11 are guided with clearance. A spring 21 acts between one wall of each groove 20 and the yoke to urge the yoke against the other walls of the groove 20 to avoid spragging. The yoke 11 is also located in the piston 15 by an inwardly extending tongue 22 formed integrally with the yoke and supported by a ringlike insert member 23 in a blind bore 24 in the piston 15. The base 25 of the blind bore 24 abuts the end of the tongue 22 to transmit the hydraulically produced force acting on the piston 15 to the yoke 11 and so to the indirectly operated pad 12.

A bracket 26 is secured to the yoke 11 adjacent the pad 12 and supports a pair of pad-retaining pins 27 whose other ends are slidably received in suitable bores in the body member 10. The pins 27 have heads 28 to prevent the pins passing right through the bracket 26 and clips 20 hold the pins 27 captive on the brackets 26. Lugs 31 and 32 formed on backing plates 33 and 34 respectively on the pads 12 and 13 have apertures through which pass the pins 27 whereby the pads 12 and 13 are suspended and radially located in their appropriate positions.

As can be seen more clearly in FIGS. 2 and 3, the insert member 23, which is moulded from polypropylene having a low coefficient of friction, is a ring of generally circular configuration. However, it is provided with four equicircumferentially spaced lands 43 and 44 by which the insert member 23 fits in the piston bore 24. The diagonally opposed lands 43 are slightly broader than the lands 44. Adjacent the lands 43, the insert member has pairs of internal springy fingers 45 having free inner ends which extend towards but are spaced from each other and are provided with lands 46 for engaging the opposed faces of the yoke tongue 22. As shown in FIG. 3, the front ends 47 of the lands 43 and 44 are rounded to facilitate insertion of the insert member 23 into the bore 24. Likewise the rear ends 48 of the lands 46 are tapered to facilitate insertion of the yoke tongue 22 between the fingers 45.

The tongue 22 on the yoke 11 is resiliently located by the fingers 45. The tongue is, therefore, accurately located and supported by the piston 15.

The provision of broad lands 44 and still broader lands 43 on the insert member 23 will, it is believed, reduce wear due to friction between the member 23 and the piston bore 24. Furthermore the springy fingers 45 permit tolerance variations in the thickness of the yoke tongue 22 without distorting the circular shape of the member 23.

Preferably axial corrugations 49 are formed on the internal surface of the insert member 23 between the roots of the fingers 45 of each pair. The lateral edges of the tongue 22 engage the crowns of these corrugations and thereby ensure that the member 23 is a push fit in the piston bore 24 whilst permitting tolerance variations in the diameter of this bore.

FIGS. 4 and 5 show two further insert members 50 and 51 which are similar in most respects to the insert member 23 of FIGS. 2 and 3 and like parts are denoted by like reference numerals.

The insert member 50 of FIG. 4 differs from that of FIG. 2 in that the corrugations 49 are omitted and each of the lands 43 is replaced by a land 52 which is bisected into two portions 53 by a shallow groove 54. The portion 55 of the insert member 50 between the land portions 53 is thus somewhat more flexible and can yield under pressure from the lateral edge of the yoke tongue and so prevent excessive binding should the tongue be slightly oversize.

A similar flexibility is obtained in the embodiment of FIG. 5 in which the portions 53 of the land 52 are separated by a flat 56. In this case the inner surface 57 of the portion 55 of the insert member is slightly convex instead of flat and the roots of the fingers 45 are undercut at 58.

Although the tongue 22 is shown in FIG. 1 as being supported in a bore formed in a piston of the hydraulic actuator, it is envisaged that the tongue 22 could be supported in a similar manner in a blind bore formed in another operative component of a hydraulic actuator, such as a cylinder member.

I claim:

1. In a spot type disc brake comprising a body member, said body member having longitudinal grooves along opposite sides thereof, a yoke formed of platelike material and having opposite inside edges thereof slidably guided in said longitudinal grooves, opposed directly and indirectly operated pads supported respectively on the yoke and on the body member, a hydraulic actuator in said body member and operative between said directly operated pad and said yoke, said actuator including a movable component bearing against said yoke at an end thereof remote from said indirectly operated pad, said movable component having a blind bore with a cylindrical wall and said yoke having at said last-mentioned end thereof an inwardly directed tongue projecting into said blind bore, said tongue having opposed flat faces and opposed parallel side edges: a ringlike insert member in said blind bore and encircling said tongue on said yoke, said insert member comprising an annular body of a resilient synthetic plastics material and having outer surfaces engaging said cylindrical wall of said bore, and pairs of internal fingers extending coaxially inwardly towards each other from said annular body, each finger of each pair being in spaced substantially parallel relationship with the other of the pair, each pair of fingers having free inner ends which are spaced from the inner ends of the other pair of fingers, said pairs of fingers straddling said tongue from the side edges thereof and engaging said opposite flat faces of said tongue for supporting and slidably locating said tongue.

2. An insert member according to claim 1 in which the inner ends of the internal fingers have lands thereon by which they engage said opposed faces of said tongue.

3. An insert member according to claim 1 in which said insert member is of generally circular configuration but has four equicircumferentially spaced external lands thereon in slidable engagement with said cylindrical wall of said bore.

4. An insert member according to claim 3 which has corrugations on its internal surface between the roots of said pairs of fingers, said corrugations engaging said side edges of said tongue.

5. An insert member according to claim 3 in which said external lands are divided into two portions by a portion of the insert member having flexibility, said flexible portion having an internal surface engaging said side edges of said tongue.

6. An insert member according to claim 5 in which said external land portions are separated by a shallow groove and said internal surface of said flexible portion is flat.

7. An insert member according to claim 5 in which said external land portions are separated by a flat, and in which said internal surface of said flexible portion is convex and said fingers are undercut at their roots.